United States Patent [19]

Brunner

[11] Patent Number: 4,632,681

[45] Date of Patent: Dec. 30, 1986

[54] LOCKING APPARATUS FOR FILTER ELEMENTS

[75] Inventor: David E. Brunner, Waterloo, Canada

[73] Assignee: Wheelabrator Corporation of Canada, Ltd., Milton, Canada

[21] Appl. No.: 727,725

[22] Filed: Apr. 29, 1985

[51] Int. Cl.⁴ .............................................. B01D 46/12
[52] U.S. Cl. ................................... 55/493; 55/341 R; 55/508; 55/511
[58] Field of Search ..................... 55/302, 304, 341 R, 55/341 MC, 378, 493, 499, 508, 510, 511, 519

[56] References Cited

U.S. PATENT DOCUMENTS

| | | | |
|---|---|---|---|
| 2,962,121 | 11/1960 | Wilber | 55/493 X |
| 3,360,910 | 1/1968 | Soltis | 55/508 X |
| 3,393,498 | 1/1968 | Schoen | 55/493 |
| 4,217,122 | 8/1980 | Shuler | 55/493 X |
| 4,264,345 | 4/1981 | Miller | 55/341 R |
| 4,266,956 | 5/1981 | Revell | 55/493 X |
| 4,322,231 | 3/1982 | Hilzendeger et al. | 55/378 X |

FOREIGN PATENT DOCUMENTS 0742669  12/1943  Fed. Rep. of Germany ........ 55/378

Primary Examiner—Charles Hart
Attorney, Agent, or Firm—Fitzpatrick, Cella, Harper & Scinto

[57] ABSTRACT

Apparatus for releasably securing filter elements against an apertured tube sheet in a dust collector filter housing includes a pair of locking bars movable between a first position spaced from the tube sheet and a second position adjacent the sheet. Resilient means on the locking bars press portions of the filter elements into sealing engagement with the tube sheet so that the filter elements depend from the sheet when the bars are in the second position and apparatus is provided for shifting the bars between the first and second positions.

7 Claims, 4 Drawing Figures

LOCKING APPARATUS FOR FILTER ELEMENTS

BACKGROUND OF THE INVENTION

1. Field of the Invention

This invention relates to locking apparatus for filter elements, and more particularly, to apparatus for releasably locking one or more filter elements into sealing engagement with a tube sheet or the like in a dust collector filter assembly.

By way of background, dust collectors of the type here comtemplated generally include a large housing divided by a tube sheet into a lower dirty air chamber and an upper clean air chamber. Several rows of cylindrical filter elements are releasably mounted in the lower chamber in sealing engagement with the lower surface of the tube sheet so that their open upper ends register respectively with corresponding openings in the tube sheet and the interiors of the elements communicate with the upper clean air chamber. More specifically, each filter element is provided with a mounting plate in the form of a flange surrounding its upper end and it is these flanges that are mounted in sealing engagement with the tube sheet, a suitable gasket being secured to each mounting plate about the open upper end of the filter elements for effecting an air tight seal with the tube sheet.

Air laden with dust particles, for example, is fed into the lower chamber and passes through the filter elements, which remove the particles from the air, and thence into tne upper chamber from which the filtered, clean air may be taken.

It is known to clean the filter elements periodically by applying downwardly directed pulses of air to the interior of each element in opposition to the direction of flow of the air being treated, thus releasing accumulated dust particles from the filter elements. The released particles accumulate in the lower chamber from which they can be removed. While this procedure of course extends the life of the filter elements, they must nevertheless be replaced from time to time.

Heretofore the filter element replacement procedure has been cumbersome, time-consuming and unpleasant and efforts have been made to provide apparatus of the class described which reduce the difficulties and time necessary to replace the filter elements. Thus, it is known from U.S. Pat. No. 4,322,231 to provide a locking arrangement by which filter elements are releasably held against the underside of the apertured tube sheet which carries pairs of locking bars, each pair supporting a row of filter elements. Each bar is semicircular in cross-section so as to define a flat supporting surface and a curved camming surface, the bars being maintained in position by a number of support brackets fixed to transverse beams depending from the tube sheet. Each bracket is formed with at least a trough within which the bars are seated and a handle is affixed to each of the bars and extends perpendicularly from the longitudinal axis of its respective bar.

When the handles are in vertical position, the underside of mounting plates associated with the filter elements, are allowed to rest on the flat surfaces of the associated locking bars so that the filter elements can slide along the bars and out of the filter housing when replacement is required.

To secure the filter elements in active position, the handles are rotated to a horizontal position causing the curved camming surfaces to bear against the underside of the mounting plates forcing the filter elements into engagement with the undersurface of the tube sheet. A gasket is secured to each mounting plate about the open upper end of the filter elements to effect a seal with the tube sheet.

Each handle is equipped with an L-shaped supporting bracket so that when an adjacent pair of locking handles are in the horizontal position, each handle may rest within the L-shaped supporting bracket of the other to prevent the handles from pivoting back to their vertical positions to release the force securing the filter element mounting plates against the tube sheet.

When it is intended to release the filter elements from active position, one of the handles is slightly raised to clear the supporting bracket of the other handle so both handles can be lowered to vertical position to rotate the locking bars and release the force securing the filter elements in active position, whereupon they may be made to slide out of the housing.

British Pat. No. 2,516,721 teaches that the filter elements are secured against the tube sheet by a tie rod extending centrally through the length of each filter and being secured at its upper end by a barrel nut received in associated notches in the upper surface of a spider secured to the lower surface of the tube sheet and centered in the associated aperture.

Attention is also invited to U.S. Pat. No. 4,323,376 disclosing a filter bag assembly insertable into the lower chamber of a housing for movement along rails into position below a flanged opening in a tube sheet between upper and lower chambers. The tube sheet supports toggle clamps that must be manually operated to raise lifting means, and thus a filter bag frame assembly, until a hook-shaped flange engages a gasket fixed to the bottom of a bulkhead to form a seal therewith.

The lifting means takes the form of an eye bolt and hex nut assembly (FIG. 7), a locking lever and hook arm (FIG. 8) or a disk secured at the lower end of a vertically movable rod (FIG. 4).

Another arrangement is disclosed in U.S. Pat. No. 4,253,856. In this case, a header plate has an aperture through which a venturi member extends to enter an end of a filter element. An annular shoulder dn the venturi member has an outer diameter at least as large as the opening and a collar having an inner diameter less than that of the outer diameter of the shoulder and surrounding the filter. The collar is releasably secured to the header plate by resilient spring steel wire clips acting through a pair of ears. These clips are coiled around pins secured to appropriate stiffening members and have a camming end that engages one ear to support the collar while the other end of the clip is releasably retained by suitable means.

A workman aligns the unit in a plate aperture and rotates the collar until flanges depending from the ears abut the pins to support the collar. Sealing of the filter unit and venturi to the tube sheet is effected by shifting the clips to place the connecting portions in holes provided for the purpose in the stiffening members.

Other relevant patents known to me are U.S. Pat. Nos. 2,641,332, 4,328,014, 4,217,122, 4,089,664, 3,083,043, 4,002,443 and 3,393,498.

It will be seen that the publications mentioned above involve complex and expensive structures and in some cases, require time consuming, manual filter element replacing operations in dust laden environments.

Moreover, none of the prior teachings known to me take into account the fact that the tube sheet with a plurality of openings required in apparatus of the class described invariably contains irregularities in its surface flatness so that if the same force is applied to each filter element when mounting it against the underside of the tube sheet, some elements will be more positively sealed than others so that leakage past the interfaces between the tube sheet and the element is a persistent problem which appears heretofore to have been neither attacked nor solved by those persons skilled in the art.

SUMMARY OF THE INVENTION

I have conceived and contribute by the present invention, a locking apparatus for filter elements by which I am able to overcome the foregoing difficulties and disadvantages. Thus, the present structure is simple in construction and operation and permits the changing of filter elements in a minimum of time and away from the dusty environment.

For securing the filter elements against the tube sheets, I employ a plurality of resilient means arranged to exert sufficient force on the underside of the top cap or mounting plate of each filter to compensate for the aforementioned tube sheet surface irregularities thereby to provide proper sealing between the filter element gaskets and the tube sheet without the heretofore commonly experienced leaks.

According to one aspect of the present invention, I contribute apparatus for releasably locking at least one filter element into sealing engagement with a tube sheet in a dust collector filter housing about a corresponding number of flow through apertures in the tube sheet. The apparatus comprises a pair of locking bars and means mounting the locking bars for movement between a first position spaced from the tube sheet and a second position adjacent the tube sheet. Resilient means are supported on the locking bars for pressing portions of the filter elements into sealing engagement with a surface of the tube sheet so that the filter elements depend from the tube sheet when the locking bars are in the second position, and means are also provided for shifting the locking bars between the first and second positions.

More specifically, the resilient means comprise a pair of springs for each filter element, one spring of each pair being supported on one of the locking bars so that the springs of a pair press diagonally opposed portions of each filter element into sealing engagement with the tube sheet when the locking bars are in the second position.

In order to assure that the springs are maintained in proper position on the respective locking bars, locating pins are mounted on each bar for that purpose. Actually, these pins extend from the locking bars to a position adjacent the portions of the filter elements contacted by the springs when the locking bars are in the second position, to serve the further purpose of restricting movement of the filter elements away from the tube sheet upon the application to the filter elements of a force tending to separate the filter elements from the tube sheet such as a force caused by application to the filter elements of a reverse pulse of air under pressure to remove accumulated foreign matter from the walls of the filter elements.

According to the preferred embodiment, each locking bar is supported at one end for pivotal movement toward and away from the tube sheet and handle means are provided for each locking bar. These handles are pivotally mounted to the housing and, through over center links, to the other end of each respective locking bar so that pivoting movement of each handle shifts its corresponding locking bar into or out of operative position through the associated link.

The housing is formed with an access opening for permitting the insertion and removal of the filter elements and during operation this opening is of course closed. Since the system should not operate unless the filter elements are secured against the tube sheet, the handle means are arranged to give an indication when the filter elements are not so secured.

Accordingly, the handle means each comprise a lever so disposed relative to the access opening that when pivoted to a position to shift its corresponding locking bar away from the tube sheet, the handle means extend through the opening so that the opening may not be closed.

To effect insertion and removal of the filter elements there are provided a pair of rails, one rail at each side of the opening so that mounting plates on the filter elements may slide along the rails to be positioned for sealing engagement with the tube sheet by elevation of the locking bars.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

The best mode of the invention has been chosen for purposes of illustration and description, and is shown in the accompanying drawing forming a part of the specification, wherein.

DESCRIPTION OF THE PREFERRED EMBODIMENT

Figure 1:
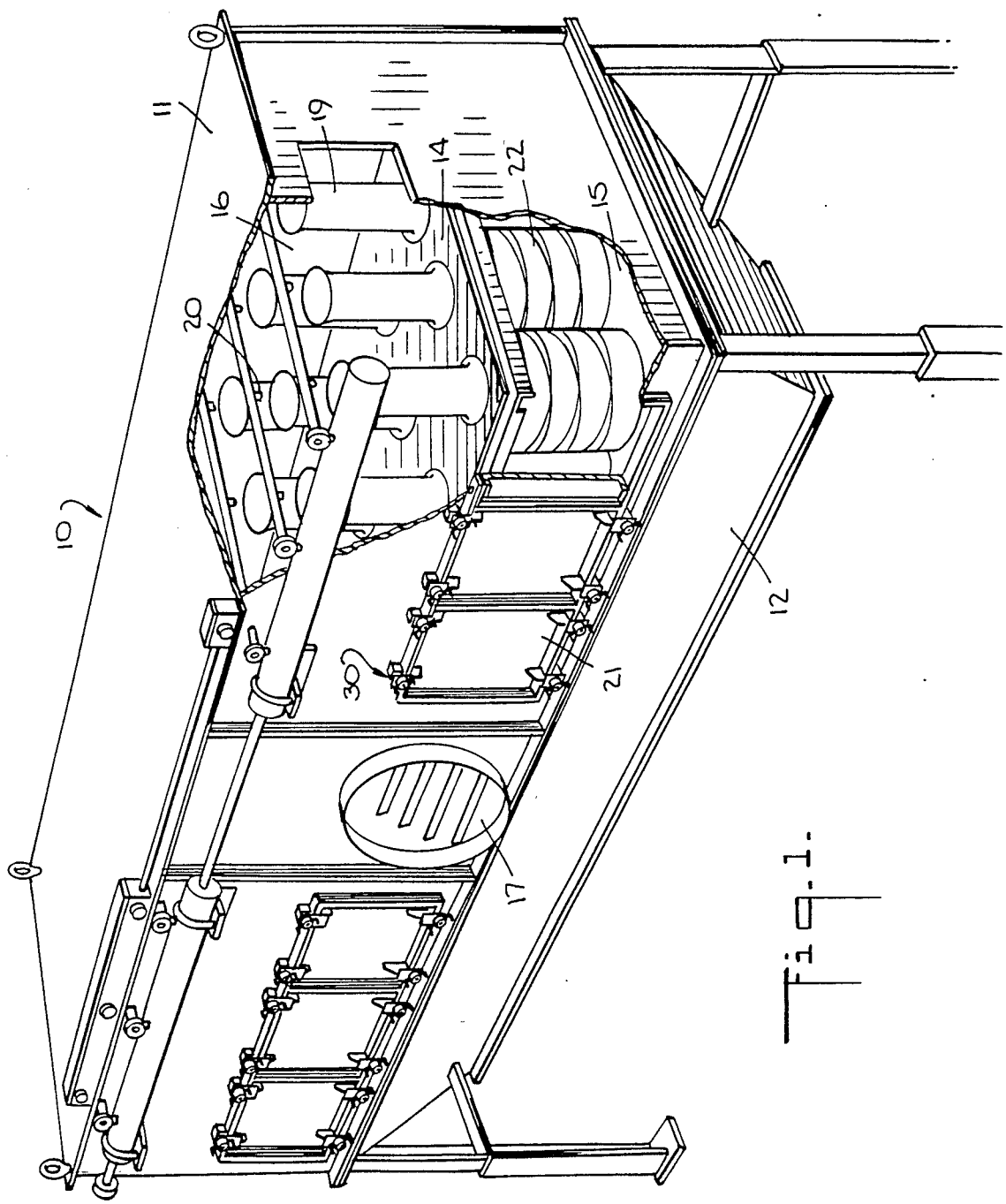
FIG. 1 is a partial sectional view of a filter assembly according to the present invention.

Referring now to the drawing, and particularly to FIG. 1, there is shown a cartridge type filter unit 10 of the type to which the present invention may be applied, and which comprises a housing 11 having a lower hopper 12 for receiving filtered material, a tube sheet 14 dividing the unit 10 into a lower dirty air chamber 15 and an upper clean air chamber 16. An air inlet 17 communicates between atmosphere and lower chamber 15 and a plurality of ejector tubes 19 extend upwardly from the tube sheet 14 to effect communication between chambers 15 and 16 through openings 18 (FIG. 2) in the sheet with suitable piping in the chamber 16 for delivering air pulses to nozzles 20, one such nozzle being directed downwardly toward the upper end of each tube 19 so that periodic pulses of air under pressure may be directed through each filter element to remove filtered material therefrom, such material falling into the hopper 12.

Access doors 21 are provided in the side of the lower chamber 15 and means are provided for mounting rows of filter elements 22 in the lower chamber, one element beneath each tube 19 so that dirty air entering the lower chamber 15 through inlet 17 passes through the filter elements, through the tubes 19, into the upper chamber 16 and is exhausted through an outlet (not shown) in the upper chamber.

As mentioned, filtered material may fall from the filter elements 22 into the hopper 12 which opens into the lower chamber 15. Such material may readily be removed from the bottom of the hopper.

Figure 2:
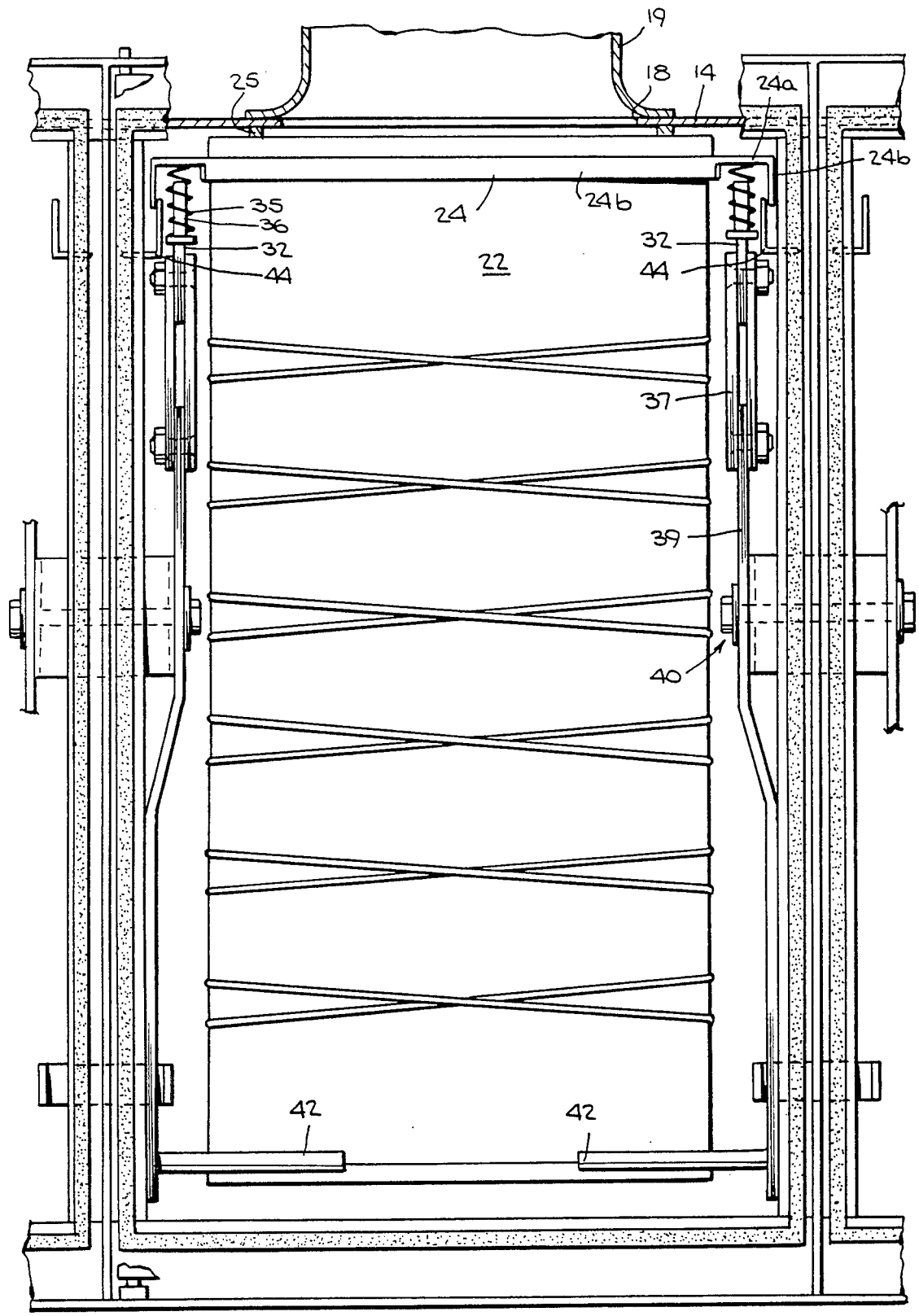
FIG. 2 is a partial sectional view illustrating the positional arrangement of various parts securing the filter elements against the tube sheet.
Figure 3:
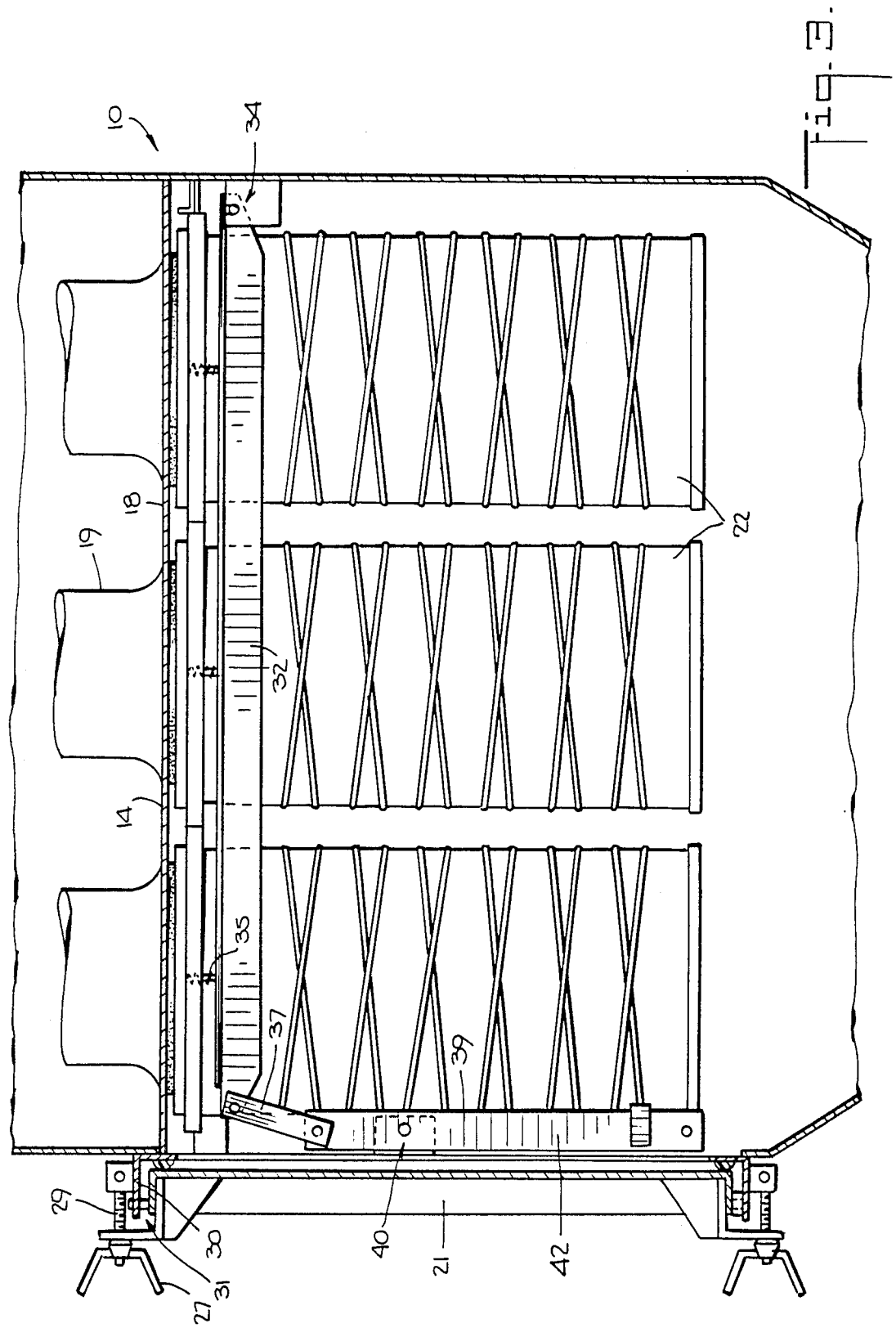
FIG. 3 is a view similar to FIG. 2 but illustrating the bar and handle in position securing three filter elements against the tube sheet and a door closing the associated access opening.

As shown in FIGS. 2 and 3, the filter elements 22, which are of cylindrical tubular configuration, are provided with mounting plates 24 at their upper ends and annular gaskets 25 of a diameter somewhat larger than the diameter of openings 18 in the tube sheet 14, and carried by the mounting plates to seal the filter elements to the lower surface of the tube sheet when the filter elements are secured against the sheet by the locking bars. It will be seen that the mounting plates are equipped with outwardly extending plates 24a terminating in depending flanges 24b for a purpose later to be described.

While, as has been mentioned, the filter elements 22 are periodically cleaned by pulses of air under pressure, it is nevertheless necessary occasionally to change the filters. To this end, each access door 21 which, when closed, is sealed against the wall of the unit 10 by a gasket 26, may be opened by unscrewing nuts 27 from bolts 29 pivotally mounted to the angle irons 30 secured to the unit 10, as shown in FIGS. 3 and 4, and swinging the door around hinge arrangement 31, each open door providing access to a row of filter elements 22.

Figure 4:
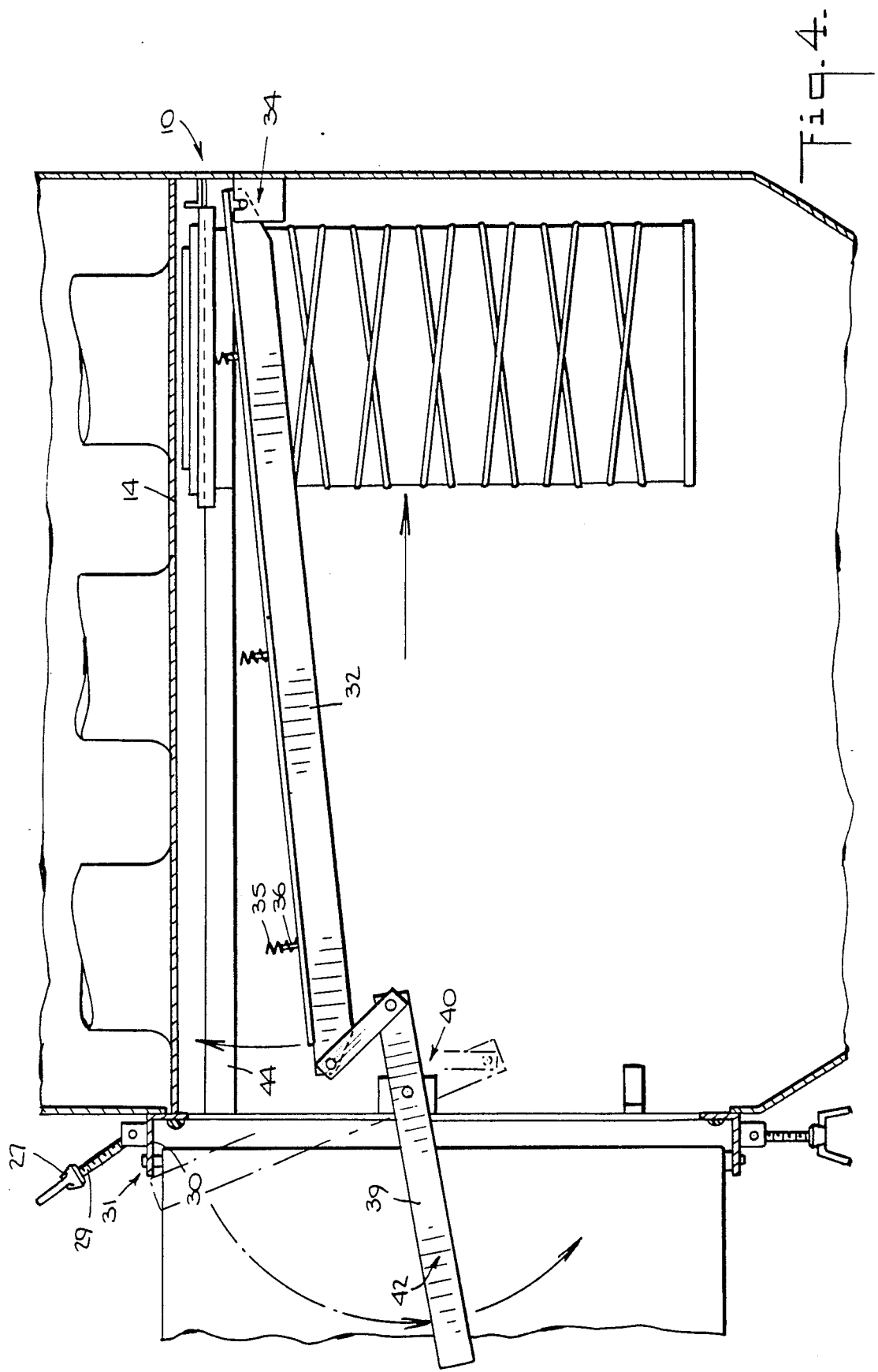
FIG. 4 is fragmentary sectional view of the assembly and illustrating one of the locking bars and its associated handle in their respective positions when the bar is in its unlocking position, i.e., spaced from the tube sheet.

As best shown in FIGS. 2 to 4, the filter elements in each row of elements, comprising three elements in this case, are secured against the lower surface of the tube sheet 18, and released therefrom by a pair of locking bars 32 each of which is mounted as at 34 to the inner wall of the unit opposite the doors 21 for vertical pivotal movement between upper (FIG. 3) and lower (FIG. 4) positions.

Each locking bar is equipped with springs 35, shown generally as helical springs equal in number to the number of filter elements 22 in each row and each surrounding a locating pin 36 upstanding from the locking bar. The springs and pins are positioned along their associated bars so that the springs, when unstressed, extend to the order of about $\frac{3}{4}"$ above their associated pins. When the locking bars are moved to filter element securing position, the springs engage the underside of the mounting plates 24 of the filter elements whereby each element is pressed against the tube sheet by a pair of springs, one on each locking bar of each pair of bars, acting against diagonally opposed portions of each filter element mounting plate. When in this position, the distal ends of the pins are preferably spaced about $\frac{1}{8}"$ from the lower surface of the mounting plates 24.

The end of each locking bar opposite its pivot arrangement 34 is provided with means for pivoting the bar between its upper and lower positions. Thus, the end of each bar 32 is pivotally connected to one end of a relatively short over-center toggle link 37, which may in fact take the form of a pair of parallel links as shown in FIG. 2, the other end of which link is pivotally connected to an actuator link 39 which in turn is mounted between its ends to the wall of the unit 10 adjacent an access opening as at 40, for pivotal movement in a vertical plane between the position shown in FIGS. 2 and 3 and that shown in FIG. 4.

As shown in FIG. 2, the lower end of each actuator link 39, as viewed, that is, the end opposite the toggle link 37 is provided with a bar handle 42 extending partially across the associated access opening.

In order to mount or replace a row of filters, the access door serving that row is opened, both handles 42 are grasped and swung from the position shown in FIG. 3 to that shown in FIG. 4 whereupon the over-center toggle links 37 pivot to the FIG. 4 unlocked position to allow the locking bars 32 to pivot downwardly about pivot 34 to relieve the force securing the filter elements against the lower side of the tube sheet 14 and allowing the filter elements to drop so that mounting plate flanges 24b descend inside the angle of elongate slide rails 44 whereupon the filter elements may be caused to slide along the rails toward the access opening and removed. Fresh filter elements may be inserted and shifted to operative position sealed against the tube sheet by reversing the above described procedure.

From the foregoing description, it will be seen that, when in operative position, each filter element is sealed against the tube sheet 14 by the action of a pair of springs 35 acting against diagonally opposed portions of the underside of the mounting plates 24 through plates 24a to compensate for inherent surface irregularities in the tube sheet to establish and maintain effective sealing between the filter element gaskets 25 and the tube sheet, thus to eliminate previously commonly experienced leaks.

As mentioned, each spring 35 extends to a point about $\frac{3}{4}"$ above its associated locating pin 36. Thus, when air is pulsed into the top of the filter elements to remove filtered material from its outer surface, the force of the pulse urges the filter elements downwardly compressing the springs. However, the downward movement of the filter elements is limited by the locating pins and, since the gaskets 25 tend to expand somewhat upon release of the spring force, leakage during pulsing is not a problem.

It will also be noted that, when the locking bars are in their lowered position, as when filter elements are being exchanged, the actuating links 39 and handles 42 extend tnrough the access openings to a position outside the unit 18 ( FIG. 4) so that the access opening may not be closed until the locking bars are raised operatively to position the filter elements.

I believe that the construction and operation of my novel locking apparatus will now be understood and that the several advantages thereof will be fully appreciated by those persons skilled in the art.

I claim:

1. Apparatus for releasably locking at least one filter element into sealing engagement with a tube sheet in a dust collector filter housing about a corresponding number of flow through apertures in the tube sheet, said apparatus comprising:

a pair of rails for supporting the filter elements;

a pair of locking bars;

means mounting said locking bars for movement between a first position spaced from the tube sheet and a second position adjacent said tube sheet;

resilient means supported on said locking bars for pressing portions of the filter elements away from said rails and into sealing engagement with a surface of said tube sheet such that the filter elements are dependent therefrom when said locking bars are in said second position; and means for shifting said locking bars between said first and second positions.

2. Apparatus according to claim 1, wherein said resilient means comprise a pair of springs for each filter element, one spring of each pair being supported on one of said locking bars, said springs pressing diagonally opposed portions of each filter element into sealing engagement with said tube sheet when said locking bars are in said second position.

3. Apparatus according to claim 2, further including locating pins mounted on said locking bars for locating said springs and maintaining the same in operative position.

4. Apparatus according to claim 3, wherein said locating pins extend from said locking bars to a position adjacent said portions of the filter elements to restrict movement of the filter elements away from said tube sheet upon the application to the filter elements of a force tending to separate the filter elements from said tube sheet when said locking bars are in said second positions.

5. Apparatus according to claim 4, wherein said springs extend to a position of the order of about $\frac{1}{8}''$ beyond the distal ends of said locating pins.

6. Apparatus according to claim 1, 2, 3 or 4, wherein each locking bar is supported at one end for pivotal movement toward and away from the tube sheet and wherein handle means provided for each locking bar are pivotally mounted to the housing and, through an over-center link, to the other end of each locking bar, whereby pivoting movement of each handle shifts its corresponding locking bar into and out of operative position through said link.

7. Apparatus according to claim 6, wherein the housing is formed with an opening for insertion and removal of the filter elements and said handle means each comprise a lever so disposed relative to the opening that when pivoted to a position to shift its corresponding locking bar away from the tube sheet, said handle means extends through the opening so that the latter may not be closed.

* * * * *

UNITED STATES PATENT AND TRADEMARK OFFICE
CERTIFICATE OF CORRECTION

PATENT NO. : 4,632,681

DATED : December 30, 1986

INVENTOR(S) : DAVID E. BRUNNER

It is certified that error appears in the above-identified patent and that said Letters Patent is hereby corrected as shown below:

Column 1, line 31, change "tne" to --the--.

Column 2, line 44, change "dn" to --on--.

Column 6, line 57, change "tnrough" to --through--.

Signed and Sealed this

Third Day of March, 1987

Attest:

DONALD J. QUIGG

Attesting Officer

Commissioner of Patents and Trademarks